July 13, 1937.  P. JOOST  2,087,091
HARVESTING MACHINE
Filed May 29, 1936   2 Sheets-Sheet 1

Inventor
Paul Joost

July 13, 1937.  P. JOOST  2,087,091
HARVESTING MACHINE
Filed May 29, 1936  2 Sheets-Sheet 2
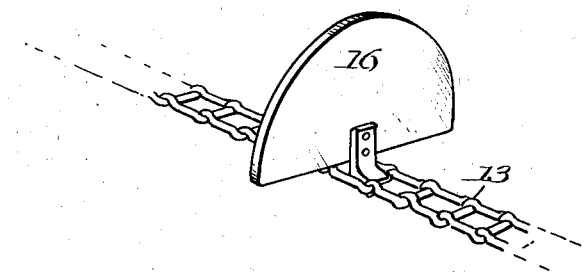
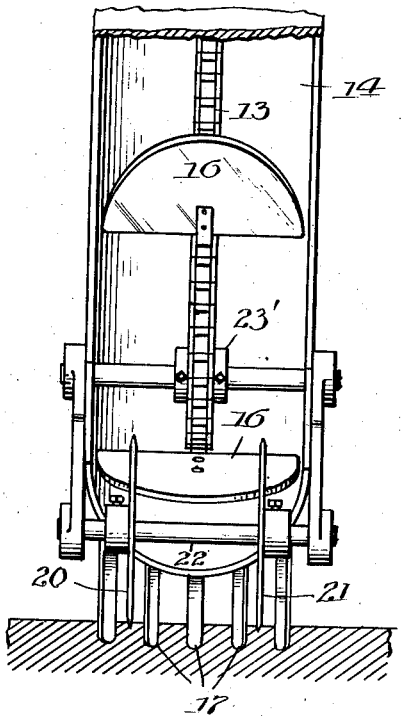
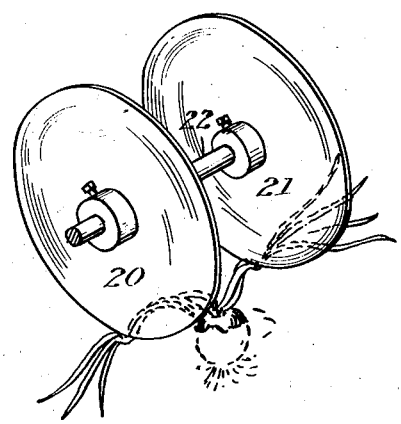
Inventor
Paul Joost Patented July 13, 1937

2,087,091

UNITED STATES PATENT OFFICE 2,087,091

HARVESTING MACHINE

Paul Joost, Arlington Heights, Ill.

Application May 29, 1936, Serial No. 82,591

10 Claims. (Cl. 55—9)

The invention relates to harvesting machines, and particularly to that type designed to harvest vegetables, particularly onions.

The invention has, among its principal objects, the provision of an extremely simple structure capable of denuding vegetables of their tops, excavating the commodity from the soil, cleansing the commodity by removing the soil therefrom, and delivering said commodity in a cleansed condition from the harvester.

Another object of the invention is to provide a structure in which the excavator may be arranged to excavate at different depths, and also to provide a vegetable topping device in which the elements thereof may be disposed relatively to each other in a manner to compensate for various distances between rows. In addition to the above, it is an object to provide a structure capable of being associated with a tractor and be driven thereby.

The invention also contemplates utilization of an elevating conveyor, one end of which is capable of adjustment to accomplish excavation at different depths, the conveyor being pivoted in a manner to permit adjustments of the free end thereof to accomplish proper excavation, without interfering with operation of other portions of the device.

The invention has these and other objects, all of which will be explained in detail and more readily understood when read in conjunction with the accompanying drawings, which illustrate one embodiment of which the invention is susceptible, it being manifest that changes and modifications may be resorted to without departing from the spirit of the appended claims, forming a part hereof.

In the drawings, Fig. 1 is a side elevation of a tractor having the invention applied thereto;

Fig. 3 is a perspective view of one of the flights of the conveyor;

Fig. 4 is an end view of the conveyor housing, having tines provided thereon to facilitate excavation of the vegetables; and Fig. 5 is a view of the mechanism for denuding the vegetables of their tops.

Figure 1:
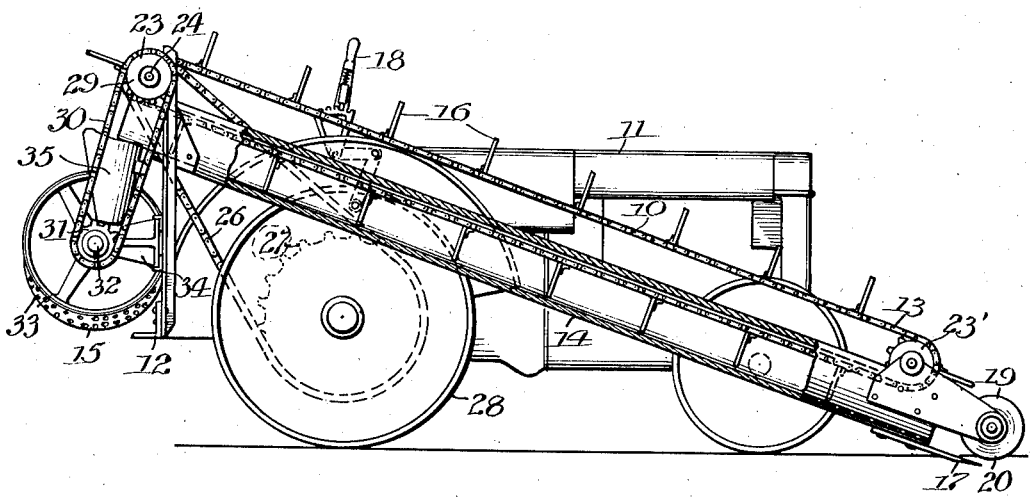
Figure 2:
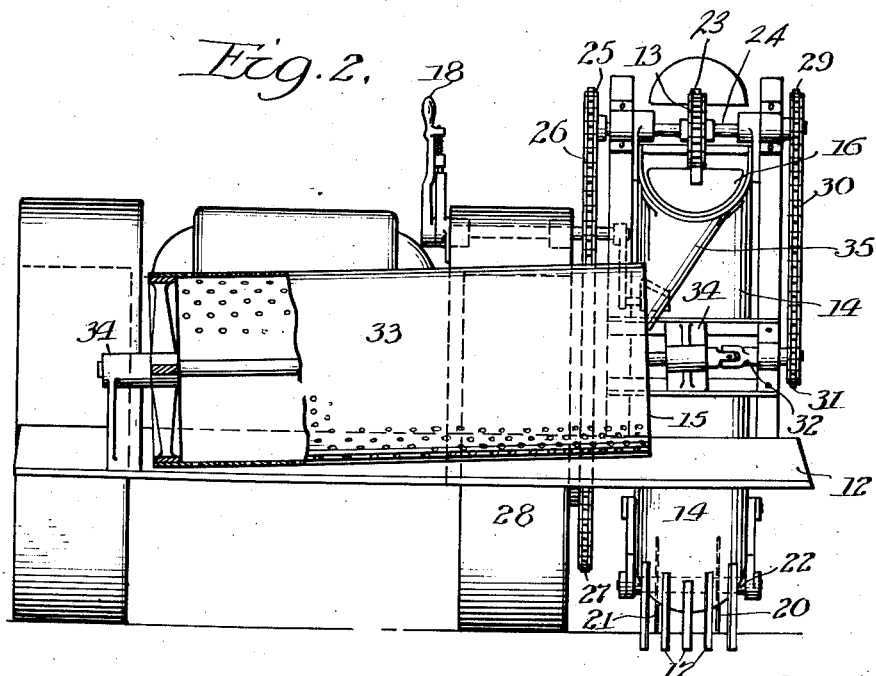
Fig. 2 is a view of the rear end of the structure shown in Fig. 1.

The invention contemplates the utilization of an inclined elevating conveyor 10, one end of which is supported by the tractor 11, the conveyor 10 being pivotally connected with the tractor 11 by means of the auxiliary frame 12, whereby the device per se is attached to the tractor. The opposite end of the conveyor provides an excavator and is adjustable to thereby permit this end to be arranged to excavate at different depths, dependent upon the particular vegetable being harvested. This elevating conveyor includes an endless belt 13 and a housing or trough 14 which assists the conveyor in elevating the commodity from the surface of the ground to a screen 15. The conveyor belt 13 is provided with a plurality of flights 16, which correspond in outline to the cross section of the interior of the housing, and therefore the commodity may be successfully conveyed along the inclined housing without injury to the commodity. The lower or free end of the conveyor is provided with a plurality of tines 17 which dig into the soil and extract the commodity from the soil during travel of the tractor, and deliver the commodity to the conveyor housing so that the commodity may be engaged by the conveyor flights to thereby elevate the commodity and deliver same to the screen, generally designated 15. The forward end of the conveyor is, as before stated, adjustable relatively to the surface of the earth to thereby regulate the depth of excavation. To accomplish this last-mentioned advantage, the conveyor is provided with the lever mechanism, generally 18, which, in addition, provides means for elevating and holding the conveyor in an elevated condition during transportation. The vegetable topping device, generally designated 19, is mounted upon the forward end of the conveyor and includes the cutting discs 20 and 21, the latter being mounted for relative adjustment upon the shaft 22 to compensate for different distances between rows. The conveyor belt 13 rides over sprocket wheels 23 and 23', the former being mounted upon the shaft 24, which shaft is carried by the auxiliary frame 12. A pinion 25 is secured to this shaft and a belt or sprocket chain 26 extends from this pinion 25 to the sprocket wheel 27, the latter being secured for rotation with the tractor wheel 28, which thus causes operation of the conveyor belt upon operation of the tractor. A sprocket wheel 29 is also secured to said shaft 24, and a sprocket chain 30 extends therefrom to a sprocket 31 secured to the shaft 32. A screen 33 is mounted upon this shaft for rotation with said shaft, the shaft being supported in brackets 34—34, secured to the auxiliary frame. This screen is inclined slightly to the horizontal and therefore the vegetables introduced thereto will be fed therefrom during rotation thereof. A chute 35 is employed to convey the commodity from the conveyor 10 to said screen 33.

From the foregoing description of the invention, it is believed evident that a simple and inexpensive device is produced, capable of harvesting and topping various vegetables, particularly onions, and which may be readily attached to an ordinary tractor to be driven thereby, adjusted to excavate at various depths, depending upon the article to be harvested, and which will also top the vegetable prior to harvesting the same, and deliver the commodity to a screen so that the article harvested may be delivered from the machine in a relatively clean condition. It is also manifest that the use of a conveyor, such as shown and described, reduces the possibility of injury to the commodity, and will successfully convey the same from the soil to the screen. Having described the invention, what I claim and desire to cover by Letters Patent is:

1. In a machine of the kind described, the combination of a carriage, means providing a conveyor, said means being supported by said carriage and including a conveyor belt and a member along which said belt operates to assist in conveyance of a commodity, a driving connection between said carriage and conveyor belt, said member and conveyor being connected with said carriage upon a pivot common to said member and conveyor, one end of said member providing an excavator and said end being adjustable about said pivot relatively to said carriage to compensate for different depths of excavation.

2. In a device of the kind described, the combination of, means providing a conveyor, said means including a conveyor belt and a channeled member, along which said belt operates to assist in conveyance of a commodity, a driving connection for driving said conveyor belt, a frame from which said channeled member and conveyor hang and to which said channel member and conveyor are pivotally connected, one end of said channeled member providing an excavator and said end being adjustable about said pivot to compensate for different depths of excavation, said frame and means providing a unit adapted to be mounted upon and be supported at one side of a tractor providing a carriage for said device.

3. In a machine of the kind described, the combination of a carriage, means providing a conveyor, said means being supported by said carriage and including a conveyor belt and a member along which said belt operates to assist in conveyance of a commodity, a driving connection between said carriage and conveyor belt, said member and conveyor being pivotally connected with said carriage upon a pivot common to both said member and conveyor, one end of said member providing an excavator and said end being adjustable with respect to said carriage about said pivot to compensate for different depths of excavation, and a topper carried by said last-mentioned end of said member.

4. In a device of the kind described, the combination of means providing a conveyor, said means including a conveyor belt and a channeled member along which said conveyor belt operates to assist said belt in conveyance of a commodity, one end of said channeled member providing an excavator and said end being adjustable to compensate for different depths of excavation, a frame to which the opposite end of said first-mentioned means is pivotally connected, a rotatable screen carried by said frame into which said conveyor discharges, said screen, first-mentioned means and frame providing a unit adapted to be secured to a carriage exteriorly of said carriage, driving means for said conveyor driven by means of said carriage.

5. In a machine of the kind described, the combination of a carriage, means providing a conveyor, said means being supported by said carriage and including a conveyor belt and a channeled member along which said conveyor belt operates to assist said belt in conveyance of a commodity, one end of said channeled member providing an excavator and said end being adjustable to compensate for different depths of excavation, and a topper provided at said last-mentioned end arranged at the mouth and adjacent the said end of said channeled member, said topper including means whereby said topping elements are laterally adjustable.

6. In a machine of the kind described, the combination of a carriage, means providing a conveyor, said means being supported by said carriage and including a conveyor belt and a member along which said conveyor belt operates to assist said belt in conveyance of a commodity, one end of said member providing an excavator and said end being adjustable to compensate for different depths of excavation, and a screen into which said conveyor discharges, a shaft having connections for driving said conveyor belt and screen, said shaft providing a pivot for said conveyor and member.

7. In a machine of the kind described, the combination of a carriage, means providing a conveyor, said means being supported by said carriage and including a conveyor belt and a member along which said conveyor belt operates to assist said belt in conveyance of a commodity, one end of said member providing an excavator and said end being adjustable to compensate for different depths of excavation, and a rotatable screen into which said conveyor discharges, a shaft having connections for driving said conveyor belt and screen and providing a pivot for said conveyor and member.

8. In a machine of the kind described, the combination of a carriage, means providing a conveyor, said means being supported by said carriage and including a conveyor belt and a channel member along which said belt operates, a frame secured to said carriage, a drive shaft carried by said frame, one end of said means being pivotally secured to said shaft, the opposite end of said means providing an excavator and said end being adjustable about said pivot to compensate for different depths of excavation, a rotatable screen into which said conveyor discharges, a driving connection between said shaft and screen, and means for holding said adjustable end of said means providing said conveyor in various adjusted positions.

9. In a machine of the kind described, the combination of means providing a conveyor and including a conveyor belt and a member along which said conveyor belt operates to assist said belt in conveyance of a commodity, one end of said means providing an excavator and being adjustable to compensate for different depths of excavation, a frame to which said means is connected providing a unit comprised of said means and frame complemental to a carriage and its frame and being constructed to arrange said unit in a plane at one side of a tractor providing said carriage.

10. In a device of the kind described, the combination of means providing a conveyor, said means including a conveyor belt, driving means for said belt and a channeled member along which said conveyor belt operates to assist said belt in conveyance of a commodity, one end of said channeled member providing an excavator and said end being adjustable to compensate for different depths of excavation, a frame providing a support for said belt, the belt channeled member and means for driving said belt providing an independent unit adapted to be connected with a carriage and arrange said member and belt in a plane at one side of said carriage.

PAUL JOOST.